Oct. 2, 1956 J. W. WIESMANN 2,764,886
IDENTIFICATION DEVICE FOR THE WIRING CELLS OF A FLOOR
Filed April 10, 1951

INVENTOR.
Joseph W. Wiesmann
BY
J. Stanley Churchill
ATTORNEY

United States Patent Office 2,764,886
Patented Oct. 2, 1956

2,764,886

IDENTIFICATION DEVICE FOR THE WIRING CELLS OF A FLOOR

Joseph W. Wiesmann, Pittsburgh, Pa., assignor to H. H. Robertson Company, Pittsburgh, Pa., a corporation of Pennsylvania Application April 10, 1951, Serial No. 220,300

3 Claims. (Cl. 72—16)

This invention relates to an identification device for the wiring cells of a floor.

The invention has for an object to provide a novel and improved device for identifying wiring cells adapted for use in a wire distributing system embodied in a floor whereby to enable location of the underlying cells and identification from the upper surface of the floor of the type of electrical service contained therein.

With this general object in view, and such others as may hereinafter appear, the invention consists in the identification device for wiring cells hereinafter described and particularly defined in the claims at the end of this specification.

Figure 1:
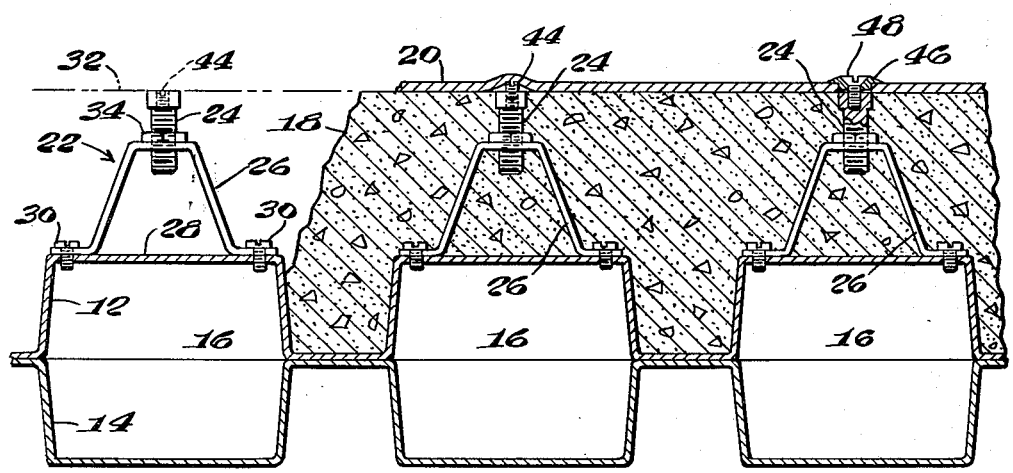
Figures 2, 3, 4, 5:
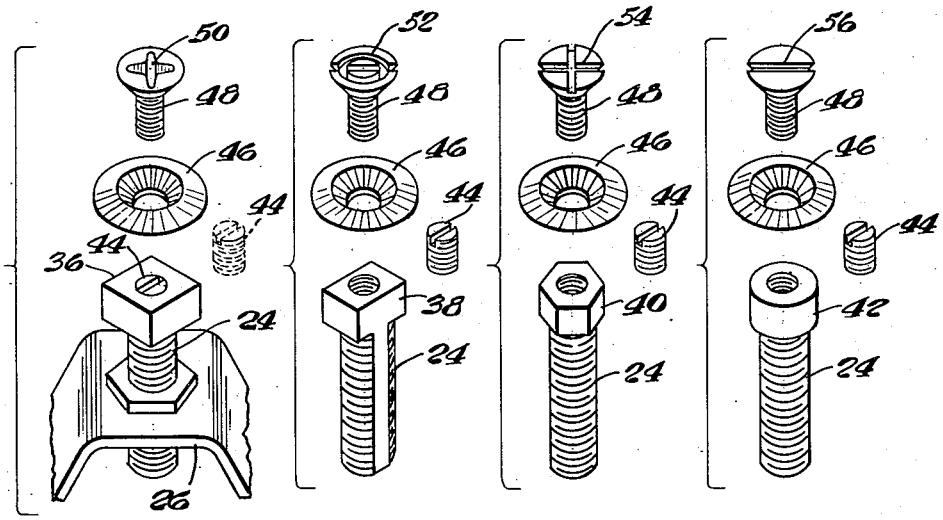

In the drawing illustrating the preferred embodiment of the invention, Fig. 1 is a cross-sectional view of a multicellular wire distributing floor provided with the present identification device; and Figs. 2, 3, 4, and 5 are exploded perspective views illustrating the differently shaped and marked parts used for identifying different types of electrical service contained in the cells.

In general, the present invention contemplates a novel and improved identifying device for use in a wire distributing system embodying a plurality of spaced and parallel metal cells or ducts embodied in or forming a part of the floor and through selected of which the wires may be drawn to provide the desired electrical service to different parts of the building. In practice, different cells may contain different isolated wiring services; for example, one cell may contain telephone wires; a second cell, direct-current wires; a third cell, low-tension or signal wires; and a fourth cell, high-tension wires. It is the aim of the present invention to provide novel identifying devices for use in locating from the top of the floor surface the underlying cells and for identifying the type of electrical service contained in a particular cell.

As illustrated in U. S. Patents Nos. 1,855,082 and 2,125,366, the metal wire distributing cells are, in practice, covered and concealed by a concrete floor fill, and suitable access openings and outlets are provided along the cells to enable the wiring to be drawn through the cells and to connect the wiring to the services required. In practice, the identifying devices or markers may be installed, preferably adjacent the ends of the cells, prior to pouring the concrete floor fill, provision being made for adjustably mounting a marker above a cell to present the upper surface of the marker flush with the screed line of the concrete floor fill, each adjustable marker being provided with a different shaped head corresponding to a particular type of electrical service contained or to be contained in the underlying cell after the concrete fill has been poured. When a floor covering, such as a rug, linoleum, or the like is subsequently laid on top of the concrete floor, provision is made for attaching a screw and grommet to the top of the adjustable marker, such screws also having different indicia formed in the upper surface thereof in order to identify the type of service contained in the underlying wire distributing cell.

Referring now to the drawings, the invention is herein illustrated as embodied in a wire distributing flooring system such as is disclosed in the United States Patents Nos. 1,855,082 and 2,125,366. Such systems embody a multicellular metal flooring through which the wires may be drawn to provide electrical service in the building and as herein shown, 10 represents one type of metal flooring used in the erection of buildings which comprises an upper corrugated sheet 12 and a lower corrugated sheet 14 welded together to form a series of spaced and parallel hollow ducts or cells 16 upon the top of which a concrete fill 18 is poured and a floor covering 20 may be laid to complete the floor. In practice, it is preferred to manufacture the cellular metal floor in units of various lengths according to the steel fabrication of the building in which the floor is to be installed, and during the erection of the floor, the units are laid end to end so that the cells of one unit cooperate with and form extensions of the cells of a second unit to provide a plurality of continuous conduits extending across the building and through which the wiring for electrical service of various types may be drawn.

As herein illustrated, the identifying devices indicated generally at 22 are preferably placed adjacent the end of a cell run, and each device may comprise a marker bolt 24 adjustably supported in an extension bracket 26 attached to the upper wall 28 of a cell 16 by screws 30. The bolt 24 may be threaded to engage with a threaded opening in the upper end of the bracket 26, and in operation, the bolt may be adjusted in the bracket to present the upper surface of the marker bolt flush with the screed line 32 of the subsequently poured concrete floor fill, as indicated at the left in Fig. 1. The bolt may be locked in its adjusted position by a lock nut 34. The bracket 26 may and preferably will extend transversely of the cell to which it is attached to present the marker bolt in alignment with the center line of the cell, and as herein shown, the bracket may comprise a sheet-metal strap of substantially inverted V-shape, the upper end of the inverted V being flattened and the outspread legs of the V having laterally extended portions attached in the field to the upper wall of the cell by self-tapping screws. The overall width of the bracket may be substantially equal to the width of the upper wall of the cell.

In the erection of the wire distributing system, the identifying devices 22 are assembled as shown in the left-hand side of Fig. 1 prior to pouring the concrete floor fill 18 so that when the concrete has set the top surfaces of the heads of the bolts 24 are flush with the upper surface of the concrete floor fill and thus serve to locate the center lines of the underlying ducts or wire-carrying cells. In order to identify the type of electrical service contained in the cell, each bolt head may be of a different predetermined shape for a particular specific type of service. Thus, for example, as shown in Figs. 2 to 5, a cell carrying telephone-service wiring may be provided with a marker bolt 24 having a square head 36; a cell carrying direct-current wiring may be provided with a rectangular elongated head 38; a cell carrying low-tension or signal-service wiring may be provided with a marker bolt having a hexagonal head 40; and a cell carrying high-tension wiring may be provided with a marker bolt having a circular head 42 whereby to enable the various types of service to be identified from the upper surface of the concrete floor fill.

As herein illustrated, each bolt head is provided with a small headless slotted set screw 44 threaded in the upper end and centrally thereof, and when a floor covering, such as linoleum is to be laid on top of the concrete floor surface, the small headless set screws 44 may and preferably will be partially unscrewed from the marker bolts 24 prior to laying the floor covering, as shown in the center cell in Fig. 1, so that when the floor covering is laid, the upwardly extended screws 44 will cause bulges or protrusions to aid in locating the identifying devices through the floor covering.

Thereafter, in order to locate the cells and to identify the type of service from the top of the floor covering, the floor-covering material above and around the small headless screw may be cut out to form a round hole and the small headless screw may then be entirely withdrawn and discarded to be replaced by an additional identifying means comprising a grommet 46 and a flat-head screw 48. As herein illustrated, the grommet 46 may be provided with a downwardly extended shoulder portion arranged to fit into the round opening formed in the floor covering, the flanged portion of the grommet being beveled and covering the edges of the opening. The flanged portion of the grommet overlying the floor covering may and preferably will be relatively thin to form a minimum protrusion above the floor covering, and the grommet is further provided with a countersunk opening to receive the flat-head screw 48 which may be screwed into the tapped hole in the center of the marker bolt 24 and from which the small headless screw 44 was removed, as shown in the right-hand cell in Fig. 1.

The flat-head screws 48 are screwed down flush with the upper surface of the grommet, and in order to identify the type of electrical service in the underlying cells by the screws, each screw 48 may be provided with different identifying indicia cut in its upper surface, as illustrated in Figs. 2 to 5. Thus, the square-head marker bolt indicating telephone service may be provided with a flat-head screw having cross slots 50 closed at their outer ends; the rectangular-head marker bolt indicating direct-current service may be provided with a flat-head screw having a circular slot 52 and the usual single screw-driver slot cut in the head thereof; the hexagonal-head marker bolt indicating the signal or low-tension service may be provided with a flat-head screw having cross slots 54 open at their ends; and the circular-head marker bolt indicating the high-tension service may be provided with a flat-head screw having the usual single slot 56 cut in the head thereof.

It will be seen that the small headless screw 44 also serves to prevent filling of the tapped hole in the bolt with concrete during the pouring operation so that when the headless screw 44 is removed to be replaced by a flat-head screw, a clean tapped hole is revealed.

The height of the floor fill above the upper surface of the cell may vary for different types of buildings so that a variation in height of the floor fill from 2½ to 6 inches may occur, for example, and in practice, the height of the extension bracket 26 may be varied proportionately to accommodate such different heights of floor fill so as to dispose the marker bolt 24 at a suitable height to permit field adjustment of the bolt whereby to present the upper surface thereof flush with the screed line. It will be seen that the use of an extension bracket 26 permits a relatively short marking bolt 24 to be used which is of advantage as compared to a relatively long bolt directly connected to the relatively thin-walled cell which is easily subject to being kicked over or broken off during the installation work or during the pouring of the floor fill. In operation, the present cell-locating and identifying device, as mounted in an extension bracket attached to the upper wall of the cell is firmly secured in place without the necessity of applying grouting thereabout and is not subject to easy displacement during the pouring of the concrete floor fill.

From the above description of the preferred embodiment of the invention, it will be seen that the present novel structure of identifying device for wiring cells enables the cells to be easily and quickly located and the electrical services contained therein identified from the upper surface of the floor. It will be further observed that the present identifying device may be quickly and economically installed and may be easily adjusted in the field to accommodate various heights of floor fill. It will also be observed that the present identifying device is firmly secured and rigidly constructed so as to enable it to withstand the normal hazards incident to pouring of the concrete floor fill, such as being kicked by a worker, without breaking or displacement thereof from the cell.

While the preferred embodiment of the invention has been herein illustrated and described, it will be understood that the invention may be embodied in other forms within the scope of the following claims.

Having thus described the invention, what is claimed is:

1. In a wire distributing floor having a plurality of longitudinally extended wire distributing cells through which extend the wiring for different types of electric service, a floor fill covering and concealing said cells and a floor covering laid on the floor fill, and identification devices for each of said cells for enabling the underlying cells to be located and the particular wire service contained therein identified from the upper surface of said floor, each of said identification devices comprising an extension bracket secured to the upper wall of a cell, said extension bracket comprising a short metal strap extended transversely of the cell and being substantially of inverted V-shape flattened at its upper end and having lateral extensions from the lower ends of the legs of the V, a marker bolt adjustably mounted in the flattened upper end of said bracket and having its upper end flush with the upper surface of the floor fill for locating and identifying the wiring service in the underlying cell before the floor covering is laid, means for locking the marker bolt in its adjusted position, and a second locating and identifying element extending into an opening in the floor covering and connected to the upper end of said bolt for locating and identifying the wiring service in the underlying cell, after the floor covering is laid, said element comprising a flat-head screw, threaded into the bolt and a flanged and beveled countersunk grommet placed to present a portion thereof within said opening and with the flanged portion extending over said opening and projecting above the upper surface of said floor covering and receiving the flat head screw, said marker bolt having a shaped head and said screw having indicia in its upper surface, each for identifying the same particular type of service contained in the underlying cell.

2. In a wire-distributing floor having a plurality of extended wire distributing cells through which extend the wiring for different types of electrical service, a floor fill covering and concealing said cells and a floor covering laid on the floor fill, identification devices for each of said cells for enabling the underlying cells to be located and the particular wire service contained therein identified from the upper surface of the floor, each of said identification devices comprising an extension bracket secured to the upper wall of a cell, said extension bracket comprising a sheet metal strap having a flattened portion spaced from said cell and extending substantially parallel to the upper surface of said cell, said flattened portion being disposed over said cell, a marker bolt adjustably secured in said flattened portion of said bracket and having its upper end flush with the upper surface of the floor fill for locating and identifying the wiring service in the underlying cell before the floor covering is laid, and a second locating and identifying element extending through an opening in the floor covering and connected to the upper end of said bolt for locating and identifying the wiring service in the underlying cell after the floor covering is laid, said second identifying element comprising a flat-head screw threaded into the bolt, and a flanged and beveled countersunk grommet placed to present a portion thereof within said opening and with the flanged portion extending over said opening and projecting above the upper surface of said floor covering and receiving the flat-head screw, said marker bolt having a shaped head and said screw having indicia in its upper surface, each for identifying the same particular type of service contained in the underlying cell.

3. In a wire-distributing floor having a plurality of extended wire distributing cells through which extend the wiring for different types of electrical service, a floor fill covering and concealing said cells and a floor covering laid on the floor fill, identification devices for each of said cells for enabling the underlying cells to be located and the particular wire service contained therein identified from the upper surface of the floor, each of said identification devices comprising an extension bracket secured to the upper wall of a cell, said extension bracket comprising a sheet metal strap having a flattened portion spaced from said cell and extending substantially parallel to the upper surface of said cell, said flattened portion being disposed over said cell, a marker bolt adjustably secured in said flattened portion of said bracket and having its upper end flush with the upper surface of the floor fill for locating and identifying the wiring service in the underlying cell before the floor covering is laid, means for locking the marker bolt in its adjusted position, and a second locating and identifying element extending through an opening in the floor covering and connected to the upper end of said bolt for locating and identifying the wiring service in the underlying cell after the floor covering is laid, said element comprising a flat-head screw, threaded into the bolt and a flanged and beveled countersunk grommet placed to present a portion thereof within said opening and with the flanged portion extending over said opening and projecting above the upper surface of said floor covering and receiving the flat-head screw, said marker bolt having a shaped head and said screw having indicia in its upper surface, each for identifying the same particular type of service contained in the underlying cell.

References Cited in the file of this patent

UNITED STATES PATENTS

| Re. 13,656 | Randolph | Dec. 9, 1913 |
| 1,861,435 | Chamberlain et al. | June 7, 1932 |
| 1,945,707 | Sharp | Feb. 6, 1934 |
| 2,081,197 | Goeller | May 25, 1937 |
| 2,257,421 | Mabry | Sept. 30, 1941 |
| 2,281,946 | O'Neill | May 5, 1942 |